United States Patent [19]

d'Alayer de Costenore d'Arc et al.5]

[11] Patent Number: 4,839,880

[45] Date of Patent: Jun. 13, 1989

[54] APPARATUS FOR LOADING RECORD DISCS OF DIFFERENT DIAMETERS IN DISC PLAYERS

[75] Inventors: Stephane M. d'Alayer de Costenore d'Arc; Philippe V. Denis, both of Genappe, Belgium

[73] Assignee: Staar S.A., Belgium

[21] Appl. No.: 100,631

[22] Filed: Sep. 24, 1987

[30] Foreign Application Priority Data

Apr. 13, 1987 [BE] Belgium ................. 8700386

[51] Int. Cl.⁴ .................. G11B 1/00; G11B 17/04; G11B 25/04
[52] U.S. Cl. .................... 369/75.2; 369/186
[58] Field of Search .................. 369/75.2, 186

[56] References Cited

U.S. PATENT DOCUMENTS

| | | | |
|---|---|---|---|
| 3,305,239 | 2/1967 | Hathaway | 369/186 |
| 3,345,775 | 10/1967 | Ferebee | 33/191 |
| 4,498,162 | 2/1985 | Schatteman | 369/77.1 |
| 4,523,306 | 6/1985 | Staar | 369/77.1 |
| 4,625,304 | 11/1986 | Kanamaru et al. | 369/75.2 |

Primary Examiner—Steven L. Stephan
Attorney, Agent, or Firm—Leydig, Voit & Mayer

[57] ABSTRACT

A record disc player apparatus of the type having a front loading drawer incorporates a centering mechanism for centering record discs of different diameters. At least three movable studs are disposed generally equidistantly about an axis of the loading drawer and are carried by support members mounted to the underside of the bottom of the drawer. Slots in the bottom of the drawer guide the studs inwardly generally toward the axis from a position spaced outwardly of the periphery of a larger of the different record discs which the loading means is adapted to carry concentric with the axis. The movable supports carrying the studs are interconnected for coordinating inward movement of the studs to engage the periphery and center a smaller record disc supported on the loading drawer only after a predetermined displacement of one of the movable supports. The predetermined inward displacement of the one support and the stud carried thereby is used to sense the presence of a larger record disc, which causes the one stud to return outwardly to avoid interference with the larger record disc. After a smaller record disc is carried to a operating position on the turnable of the player apparatus, the studs are moved away from the smaller record disc to allow its free rotation.

17 Claims, 12 Drawing Sheets

APPARATUS FOR LOADING RECORD DISCS OF DIFFERENT DIAMETERS IN DISC PLAYERS

TECHNICAL FIELD

The present invention relates to an apparatus for loading record discs in disc players and, more particularly, to disc players having means for front loading using a movable tray or drawer for carrying record discs to a turntable and which is of a type now widely provided in home music systems as well as in other applications for playing record discs of the compact disc (CD) type.

BACKGROUND ART

In such apparatus, the drawer provided in the front of the apparatus allows the record disc to be received in an external loading/unloading position, and the record discs are carried into the interior of the housing of the apparatus by translation, bringing the record discs above the turntable and finally depositing the record discs on the turntable, the record discs then being in the operating, i.e., reproduction position.

The precision of the positioning of the record discs before being lowered onto the turntable is ensured by the combination of the well-defined travel of the drawer and a fixed means carried by the drawer to receive and hold the record discs in a given position and a horizontal plane.

The positioning of the record discs is effected without any problem as long as only record discs of the same diameter are loaded. Problems arise when the apparatus is adapted to receive record discs of different diameters. It would be advantageous to provide a locating means for record discs of smaller diameter inside that provided for those of a larger diameter. This solution, which involves record disc supports at different heights, is only compatible with the requirements of the reproduction device with difficulty and greatly complicates the positioning and removal by the user of the smaller record discs into or from their position on the drawer. On the other hand, in the construction as described above, of which that forming the subject of Dutch Pat. No. 85 00593 is a good example, it has been necessary, in order to avoid insurmountable problems, to be satisfied with supports having a very slight difference in level. As a result, many users position their record discs badly or, being sensitive to inertia movement of the drawer, the record discs are displaced in an uncontrolled manner by the movement of the drawer. In both cases, the end result is to see record discs of smaller diameter badly centered and, as a result, impossible to position on the turntable with the consequence either that the equipment does not work or the record disc is not suitably clamped against the turntable.

DISCLOSURE OF THE INVENTION

The main object of the present invention is to overcome these disadvantages by providing a centering mechanism for record discs of different diameters especially suited for incorporation in the drawer of front loading disc player apparatus.

Another object of the invention is to provide a centering mechanism which is capable of centering discs of different diameters and which does not necessitate any special attention on the part of the user in placing record discs in the drawer.

Another object of the invention is to provide a centering mechanism which does not necessitate any important changes, either in the general structure of the apparatus or in the mechanism therein or in the habits of the user when loading and unloading record discs.

A further object of the invention is to provide a centering mechanism which is extremely simple, reliable, and easy to use for large-scale manufacture.

An additional object of the invention is to provide a centering mechanism which is ideally complementary to and usable with a mechanism for tilting records discs to an inclined position when in the loading/unloading position of the drawer and which facilitates the user gripping the record disc by its periphery for placing it in or removing it from the drawer. Such a mechanism for tilting the record discs incorporated in loading and unloading apparatus forms the subject of Applicant's Belgian Pat. Nos. 217,312 and copending U.S. patent application Ser. No. 100,621, filed Sept. 24, 1987.

With a view toward achieving these objects, the apparatus forming the subject of the invention comprises at least three movable studs, each mounted on a support and adapted to cooperate with the periphery of the record discs, and means for moving and guiding the studs inwardly from a position spaced outwardly of the periphery of a larger record disc and into engagement with a smaller record disc when present and for returning the studs to the outwardly spaced position, the means for moving and for guiding including coordinating means interconnecting the three supports for the three studs to obtain a coordinated movement of the three studs toward the center of the movable drawer to center a smaller record disc, this movement only taking place after a predetermined displacement of one of the supports which serves to sense the presence or absence of a larger record disc on the drawer.

Different embodiments of the invention will be described hereinafter, the first applied to a standard drawer of a front loading mechanism, the second to a drawer equipped with a mechanism for raising and lowering record discs to facilitate the user gripping a gripping a record disc in accordance with the invention described in the aforementioned copending application.

BRIEF DESCRIPTION OF THE DRAWINGS

Further objects and advantages of the invention will become apparent from the following description, taken in conjunction with the accompanying drawings, in which.

BEST MODE FOR CARRYING OUT THE INVENTION

Figure 1:
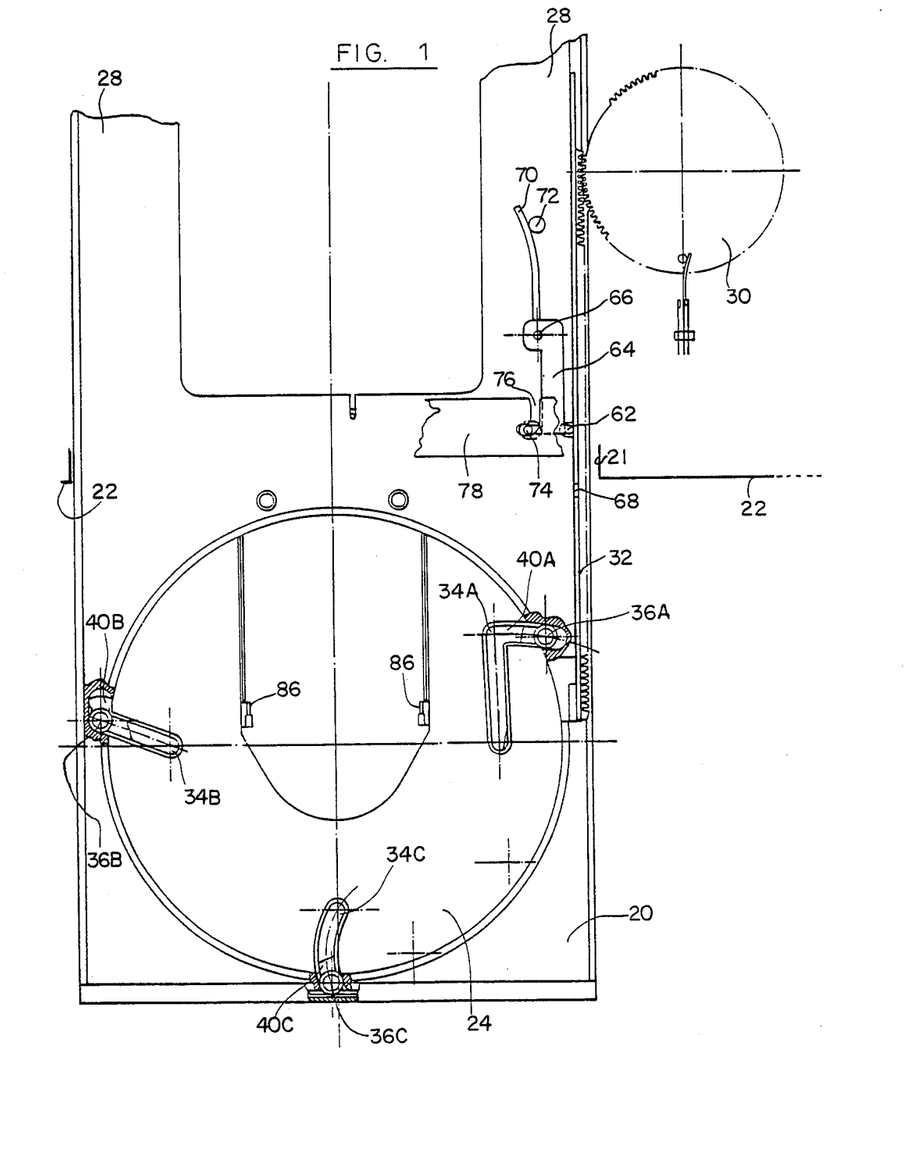
FIG. 1 is a view from above of a drawer in accordance with a first embodiment of the invention in the external. loading/unloading position.

First Embodiment—FIGS. 1-7 and 11:

As illustrated in FIG. 1, front loading apparatus includes a drawer 20 which is supported for in- and-out movement through an opening 21 in the front of the housing 22 of the apparatus and has a circular depression or recess 24 on the bottom of the drawer adapted to receive a record disc 82 which is placed in the recess 24 by the user. Two longitudinal members 28 of the drawer are supported in the housing 22 to guide the movement of translation of the drawer 20 in and out of the housing. The drawer 20 is translated by a reversible electric motor (not shown) driving a pinion 30 cooperating with a rack 32 connected to one of the longitudinal members 28 of the drawer 20.

Figure 5:
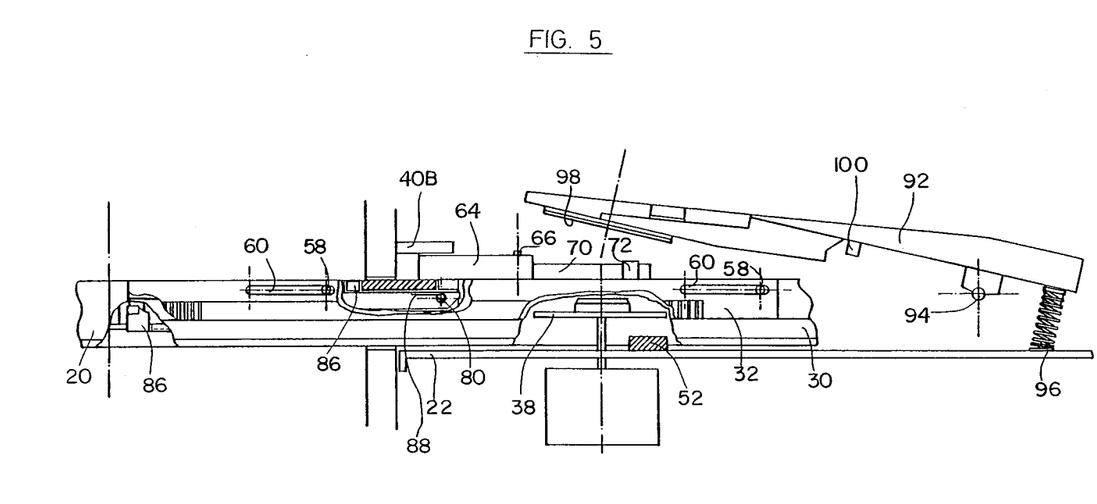
FIG. 5 is a side view of the mechanism shown in FIG. 1 and further includes certain elements of the equipment.
Figure 6:
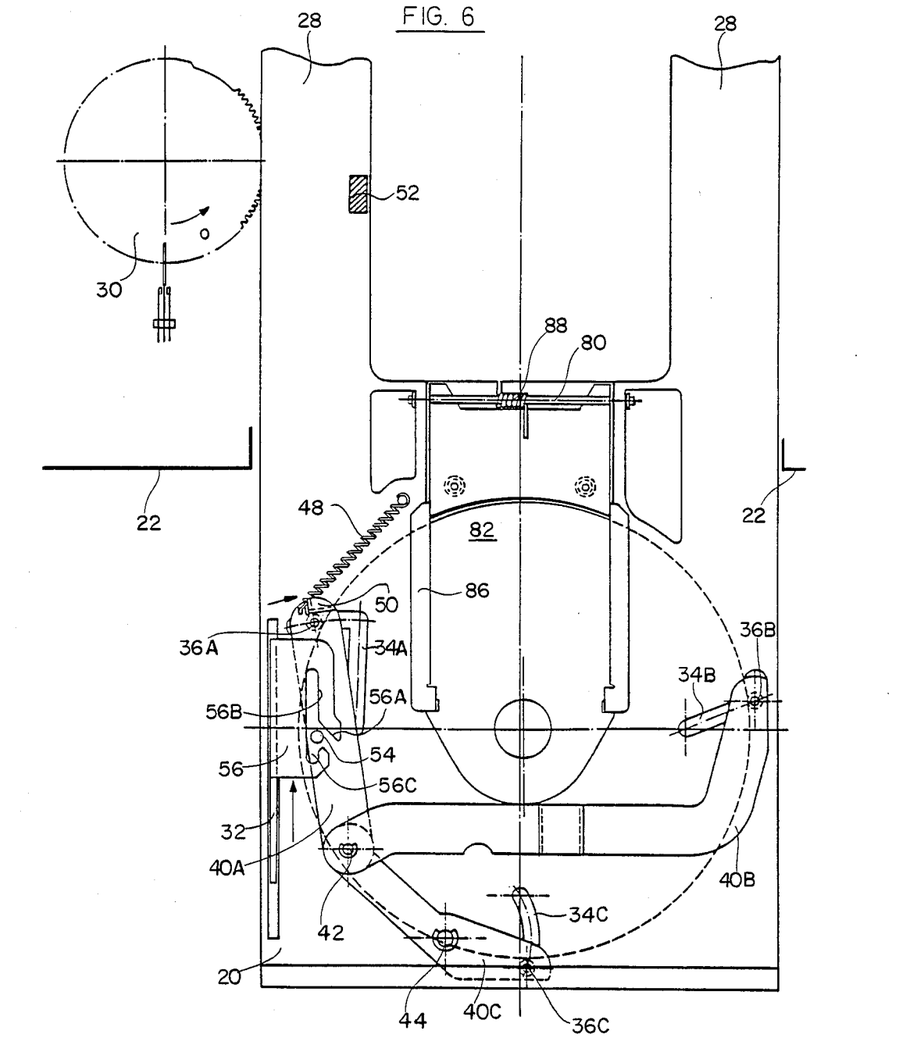
FIG. 6 is similar to FIG. 3 with a record disc of larger diameter.

The circular depression or recess 24 formed in the drawer 20 is dimensioned in such a manner as to receive and center, as shown in FIG. 6, record discs 82 of larger diameter (in the present example, a diameter of 5 inches or about 12.5 centimeters) of the different diameter record discs which the loading means is adapted to receive. At the bottom of the circular depression or recess 24, in accordance with the present invention, three slots 34A, 34B, 34C are provided, each adapted to guide the inward and outward generally radial movement of a stud 36A, 36B, 36C which projects above the surface of the circular depression or recess 24 from beneath the bottom of the drawer. The studs 36A, 36B, 36C are adapted to cooperate with the periphery of a record disc of a smaller diameter than those for which the recess 24 is dimensioned in such a manner as to center the smaller record disc about the axis of the circular recess 24 during the inward movement of the studs 36A, 36B, 36C and, as an incident to inward movement or translation of the drawer 20, to carry the record disc to a position above a turntable 38 (FIG. 5) within the housing with the objective of placing the record disc in the operating position on the turntable.

Figure 2:
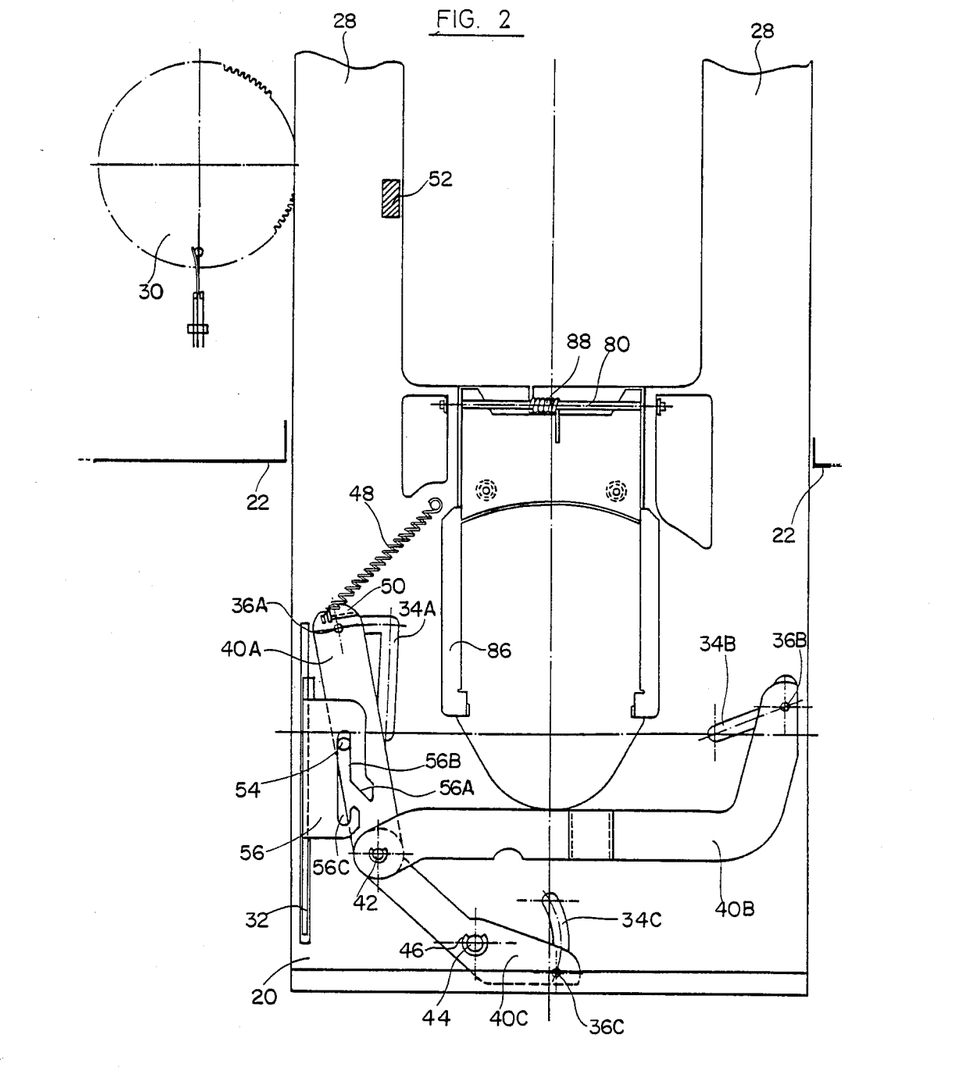
FIG. 2 is a view from below of the drawing shown in FIG. 1.

As illustrated in FIG. 2, the three studs 36A, 36B, 36C are each mounted at the end of a support 40A, 40B, 40C which is mounted beneath the bottom of the drawer, the movements of these three supports being coordinated as a result of their connection at each of their other ends by a common pin 42. One of the supports 40C is a lever pivotally mounted on the drawer 20 about a pin 44 mounted at the back of the circular recess 24 and held there by a split ring 46.

For returning the studs 36A, 36B, 36C outwardly, a spring 48 is provided, the ends of the spring being connected respectively to the casing of the drawer 20 and to the end of the support 40A carrying the stud 36A, the spring 48 producing in conjunction with a cam means 56 return of the supports to the position illustrated in FIG. 2 when they have been moved inwardly away from their outer position.

Provided at the same end of the support 40A where the stud 36A is fixed and the spring 48 is attached is a lug 50, the low level of which is lower than that of the drawer 20 and which is adapted to cooperate, when the drawer is in the interior of the housing 22, with a fixed profile 52 mounted on the housing 22 of the apparatus (FIGS. 2, 3, 5, 6, and 9) to shift the supports 40A, 40B, 40C and studs 36A, 36B, 36C carried thereby inwardly and into engagement with the periphery of a smaller record disc to center the record disc.

One of the movable supports, in this case the support 40A which carries the stud 36A, is used to sense the presence of a larger record when on the drawer 20 in the loading/unloading position by limiting the inward displacement of the support 40A upon engagement of the stud 36A with the periphery of a larger record disc after a limited inward displacement of a predetermined amount. Only after a corresponding predetermined inward displacement of the movable support 40A does the mechanism operate to move the three studs 36A, 36B, 36C inwardly to engage the periphery and center a smaller record disc. For this purpose, about half-way between the stud 36A and the pin 42, the support 40A carries a pin 54 (see FIG. 2) adapted to cooperate with a cam members 56 rigidly connected to the end of the rack 32 which moves the drawer 20 (see FIG. 11).

Figure 10:
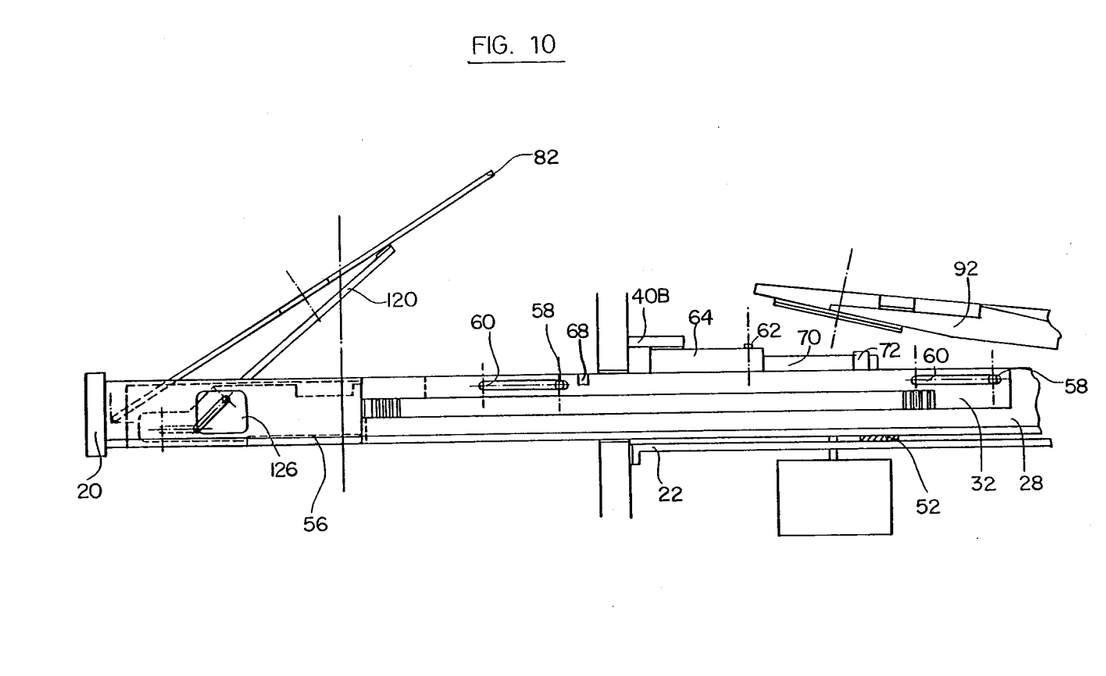
FIG. 10 is a partial side view of the second embodiment and, like FIG. 5, includes certain elements of the equipment.
Figure 11:
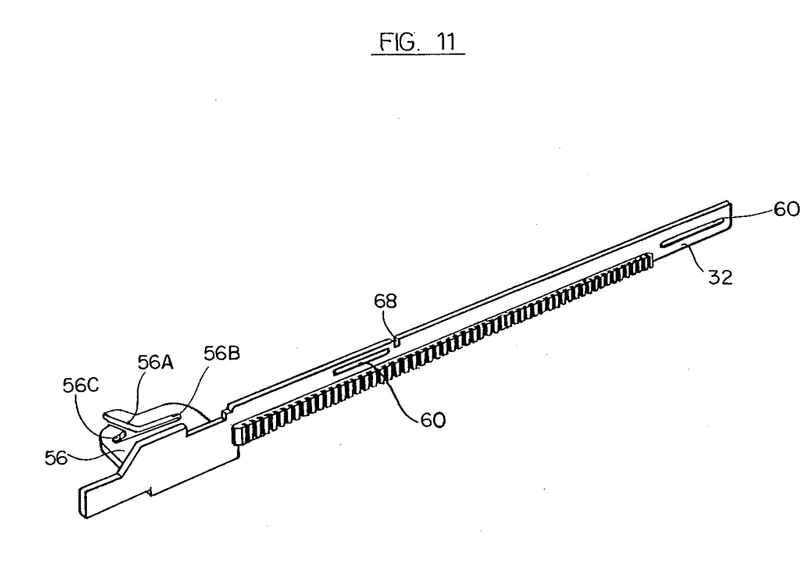
FIG. 11 is a perspective view of a control element.

The rack 32 is connected to the longitudinal member 28 of the drawer 20 by means of studs 58 and slots 60 through which the studs pass (FIGS. 5, 10, and 11). With this connection, the rack 32 is movable relative to the drawer 20 until the rack is locked to the drawer. During the relative movement, the presence or absence of a larger record disc on the turntable is sensed by the movable support 40A and stud 36A mounted thereon. Locking means are provided so that the rack 32 drives the drawer 20 after a period of relative movement, herein shown in FIG. 1, for example, as a pin 62 carried by a lever 64 pivoting about a pin 66 rigidly connected to the drawer and receivable in a notch 68 in the rack 32 under the urging of a resilient tongue 70 bearing against a stop 72 rigidly connected to the longitudinal member 28. The disengagement of the pin 62 from the notch 68 is effected by a stud 74 carried by the lever 64 and cooperating with a ramp 76 provided in a cross piece 78 rigidly connected to the housing 22 of the apparatus.

The operation of the centering mechanism to center record discs of a smaller diameter than that of the record disc for which the recess 24 is dimensioned takes place in the following manner.

A smaller record disc 82 (for example, with a diameter of about 3 inches or 8 centimeters) is deposited at the bottom of the recess 24. Voltage is applied either automatically by detection of the presence of the record disc 82 or manually by the user through means such as a loading or reproduction button, and the voltage is transmitted to the motor (not shown), causing rotation of the pinion 30 which translates the rack 32. The connection between the rack 32 and the drawer 20 allows the rack to be displaced without driving the drawer 20.

In the course of this relative displacement, the cam member 56 carried by the end of the rack 32 (see FIGS. 3 and 11) is translated and the pin 54 which is carried by the support 40A is subjected to the influence of the spring 48 by means of the support 40A and bears against the profile 56B which permits a slight pivoting of the support 40A and of the stud 36A generally radially toward the center of the recess 24.

Figure 3:
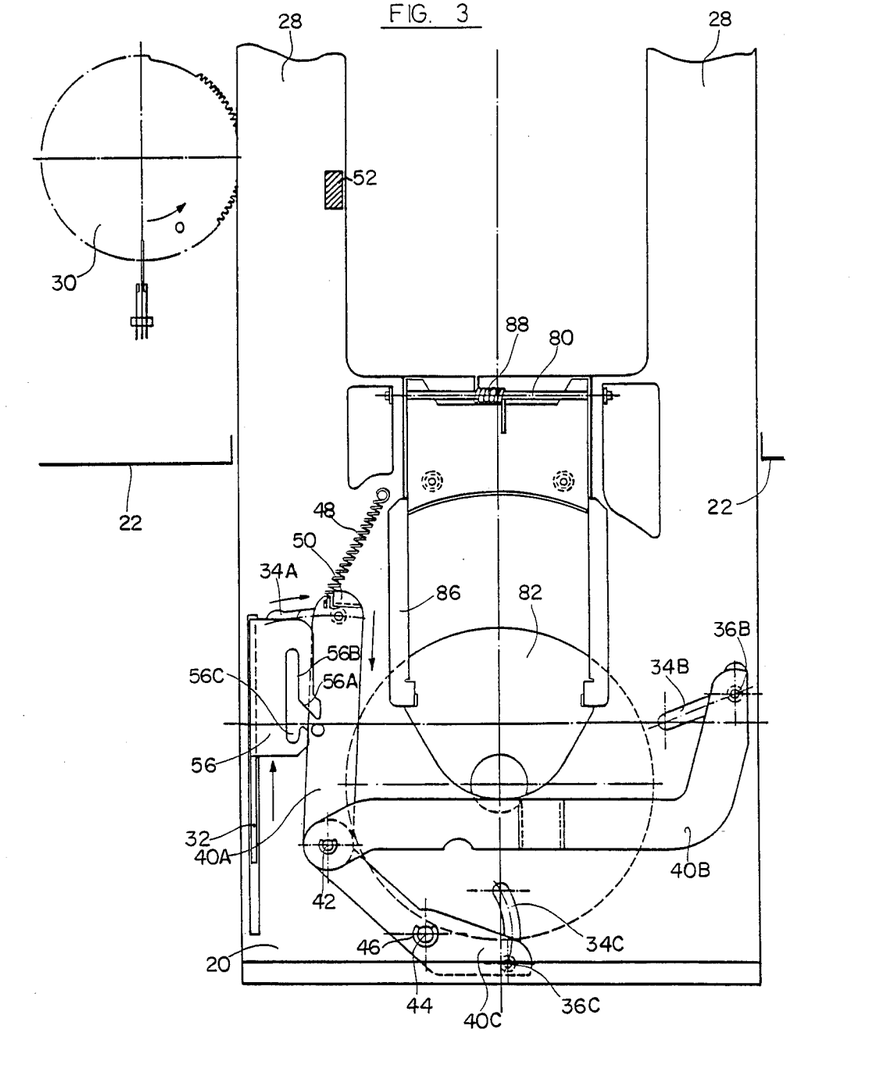
FIG. 3 is similar to FIG. 2 after a record disc of smaller diameter has been deposited and the centering mechanism activated.

When a record disc of larger diameter is on the drawer, it is sensed by the engagement with the periphery thereof by the stud 36A which limits the pivoting of the support 40A, causing the pin 54 to enter the fork (FIG. 7) provided by the profile 56C, which restores the support 40A outwardly. When a record disc 82 of smaller diameter has been deposited in the recess 24, the pivoting of the support 40A is only limited by the lateral end of the slot 34A which enables the pin 54 to escape from the cam 56, as shown in FIG. 3.

Simultaneously, since the rack 32 has completed its relative movement in relation to the drawer 20 (the pin 66 being in the notch 68), the drawer 20 is then translated jointly with the rack 32 and transfers the record disc to its operating position. In the course of this inward movement of the drawer 20 through an opening in the front of the apparatus, the lug 50 on the end of the support 40A is carried by the movement of the drawer into engagement with the fixed profile 52 mounted on the housing such that the support 40A is pushed relative to the drawer 20 toward the front of the drawer 20 (arrow A, FIG. 3). During this movement of the support 40A, the stud 36A is guided along the longitudinal section of the slot 34A, causing the other supports 40B and 40C to move in coordinated fashion with the actuating support 40A due to the connection between the supports by the pin 42, the support 40C being caused to pivot clockwise about the pin 44 and the support 40B being caused to move laterally. As a result, the three studs 36A, 36B, 36C will effect a coordinated displacement toward the center of the recess 24 and ensure the precise centering of a record disc 82 of smaller diameter in relation to the recess 24.

The fixed profile 52 in the housing is dimensioned in such a manner that, at the end of the inward movement of the drawer 20, the supports 40A, 40B, 40C are moved inwardly and center the smaller record disc 82 about the axis of the recess 24 and locate the smaller record disc in a position exactly aligned to be centered over the turntable 38. It is conventional in disc players to provide a tapered spindle 83, and when a tapered spindle 83 is provided, the record disc then being deposited on the turntable 38 is exactly centered on the turntable by the tapered spindle entering the center hole in the record disc 82. At the final stage of inward movement of the drawer 20, the actuating support 40A is subjected to a slight return movement by the fixed profile 52 and the spring 48 to move the three studs 36A, 36B, 36C slightly from the periphery of the smaller record disc 82 to permit its free rotation in the operating position on the turntable.

The raising and lowering of the record disc between the drawer and the turntable 38 is conventionally carried out by support means carried by the drawer 20 which are operative for lowering and raising the record disc. In the present case, the vertical movement of the record disc is achieved by support means shown in FIG. 5 as a pad 86 supporting the record disc 82 which is subject to the influence of the spring 88 and pivots about a pin 80. In the course of movement of the drawer 20 into the housing, the pad 86 is pivoted upwardly and raises the record disc sufficiently to clear the top edge of the spindle 83 while not raising the record disc so as to interfere with the lower edge of the opening in the housing. An arm 92 above the turntable 38 pivoting about a pin 94 and subject to the influence of a spring 96 carries a clamping means 98 for clamping the record disc 82 on the turntable 38 when the arm 92 is pivoted downward from the position shown in FIG. 5.

The drawer 20 has a ramp (not shown) permitting the pivoting of the arm 92 downward and, therefore, through the action of the stop 100 which it carries, the descent of the pad 86 at the end of the inward travel of the drawer 20 into the housing, which lowers the record disc 82 onto the turntable 38, the pad 86 then being sufficiently moved below the record disc 82 to be disengaged from the record disc to permit its free rotation by the turntable 38.

During the unloading operation of a record disc of smaller diameter, the steps described above take place in reverse order.

Figure 4:
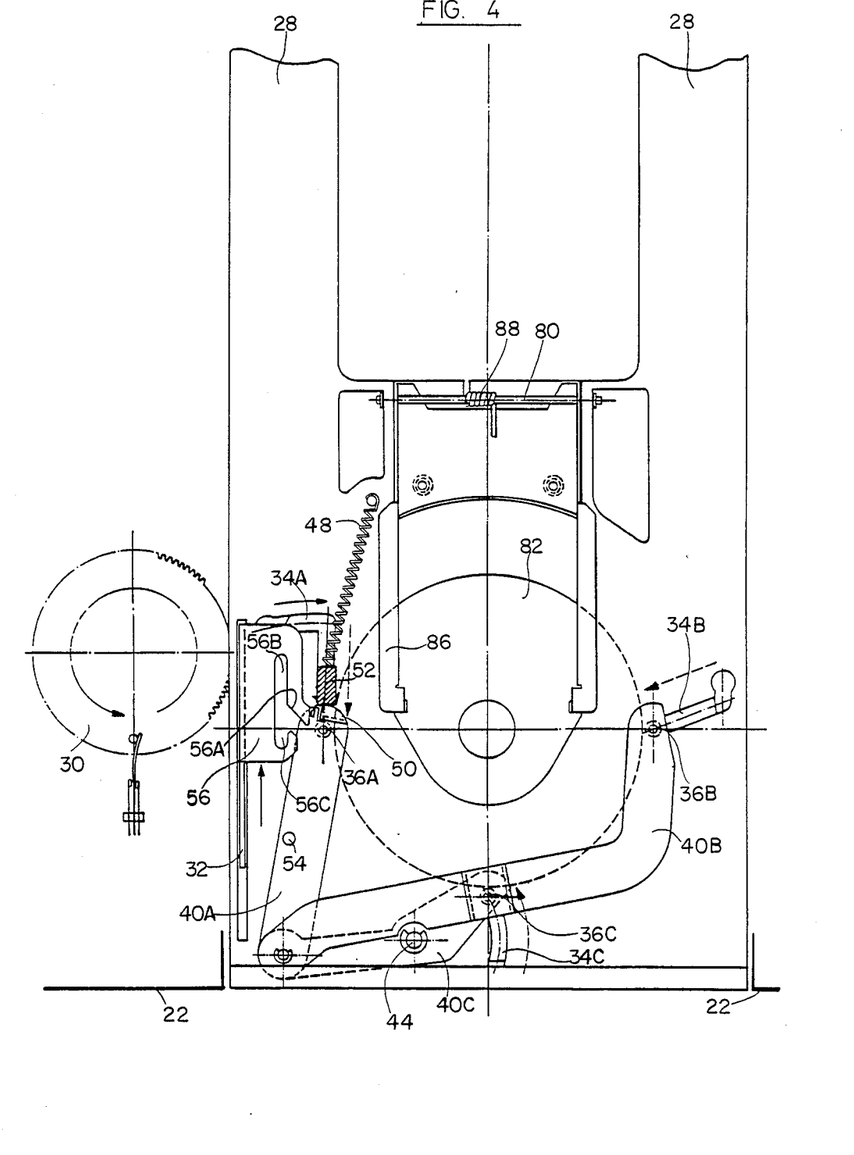
FIG. 4 is similar to FIG. 3, the record disc of smaller diameter having been centered.

Once having been raised from the turntable 38 by the pad 86, and the drawer 20 having started movement out of the housing 22, the record disc is again centered by the presence of the three studs 36A, 36B, 36C which are illustrated in FIG. 4 in engagement with the smaller record disc periphery.

The fixed profile 52 and the spring 48 acting on the supports 40A, 40B, 40C permit, during the movement of the drawer out of the housing, the reverse radially outward displacement of the supports 40A, 40B, 40C and of the studs 36A, 36B, 36C which return toward the edge of the recess 24 to the position illustrated in FIG. 3.

At the end of the movement of the drawer 20 out of the housing, the rack 32 effects relative movement in relation to the drawer 20, and the ramp 76 acting on the stud 74 causes the lever 64 to pivot and to release the pin 66 from the notch 68. As a result of the action of the profile 56A and then 56B of the cam member 56, the cam member 56 brings the pin 54 back toward the outer edge of the drawer 20 against the spring 48 in such a manner as to move the three studs 36A, 36B, 36C outwardly, completely away from the periphery of the smaller record disc 82 and to the outside of the recess 24 so that the recess 24 is free to receive a record disc 26 of larger diameter after removal of a record disc 82 of smaller diameter (FIGS. 1 and 2).

When the record disc 26 of larger diameter, of a size for which the recess is dimensioned, is positioned in the recess 24 (FIG. 1) and the motor driving the pinion 30 is switched on in order to bring the record disc into the operating position, the supports 40A, 40B, 40C effect the following movement.

During the relative displacement of the rack 32 in relation to the drawer 20, the cam member 56 is translated and, as in the case of the operation with the smaller record disc, the pin 54, subject to the influence spring 48, follows the profile 56B of the cam member 56. However, the diameter of the larger record disc, which is only very slightly less than that of the diameter of the recess 24, only permits a slight inward displacement of the stud 36A and, therefore, of the pin 54 toward the center of the recess 24 (FIG. 6). Since the pin 54 cannot exit through the opening between the profiles 56A, 56B of the cam 56, the pin 54 falls (see FIG. 7) into the fork provided by the profile 56C which then restores the stud 36A to its initial position, moving it away from the periphery of the larger record disc 26 in order to permit the free rotation of the larger record disc in the operating position on the turntable.

Figure 7:
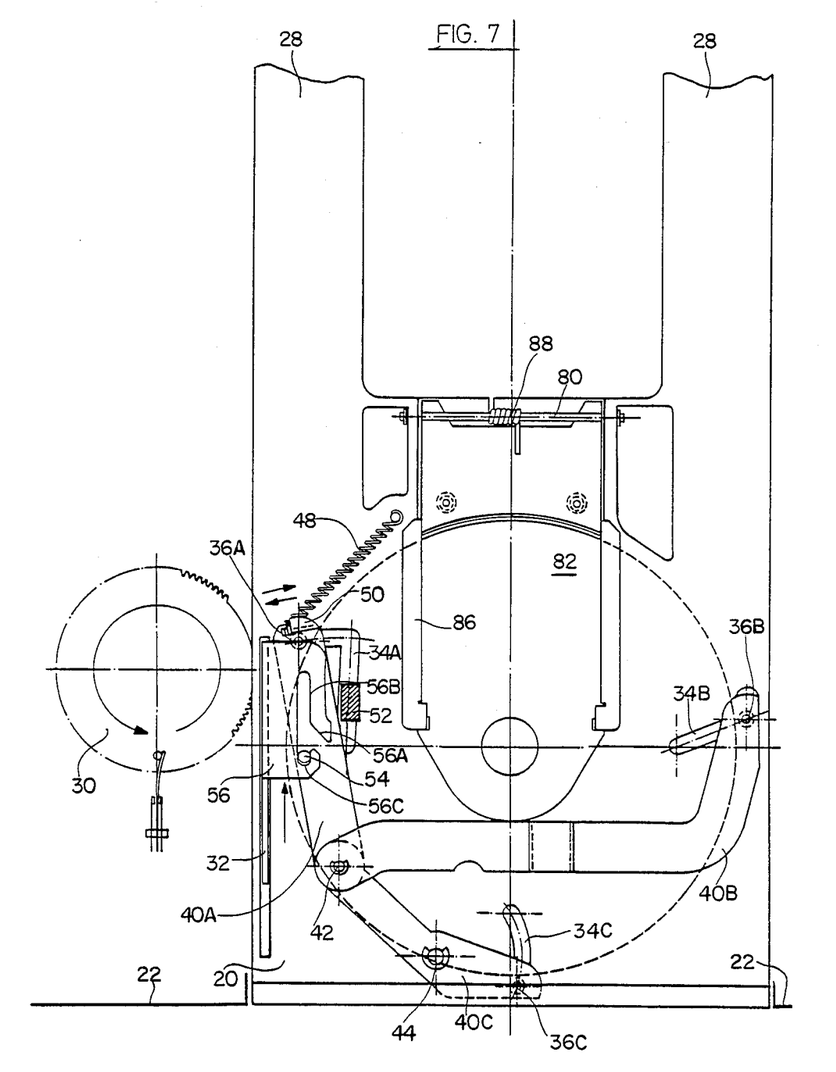
FIG. 7 is similar to FIG. 4 with a record disc of larger diameter.

Simultaneously, since the rack 32 has completed its relative movement in relation to the drawer 20, the drawer 20 is then translated jointly with the rack 32 into the housing 22 and carries the larger record disc 26 to its operating position (FIG. 7).

The fork 56C, by holding the pin 54 in the position illustrated in FIG. 7, prevents the fixed profile 52 on the housing from cooperating with the lug 50 and, as result, the supports 40A, 40B, 40C and the studs 36A, 36B, 36C are not subjected to any displacement and the free rotation of the larger record disc is ensured.

The lowering of the larger record disc 26 is effected in the same manner as in the case of the record disc 82 of smaller diameter.

During the unloading operation of a record disc 26 of larger diameter, the steps described above take place in the reverse manner and for the same reasons as explained previously. Thus, the pin 54 follows the profile 56C and then the profile 56B and so ensures the return of the three studs 36A, 36B, 36C to the extreme outer position (FIGS. 1 and 2), the mechanism being ready, after the larger record disc 26 has been removed from the recess 24, to receive and center a record disc of any diameter.

Figure 8:
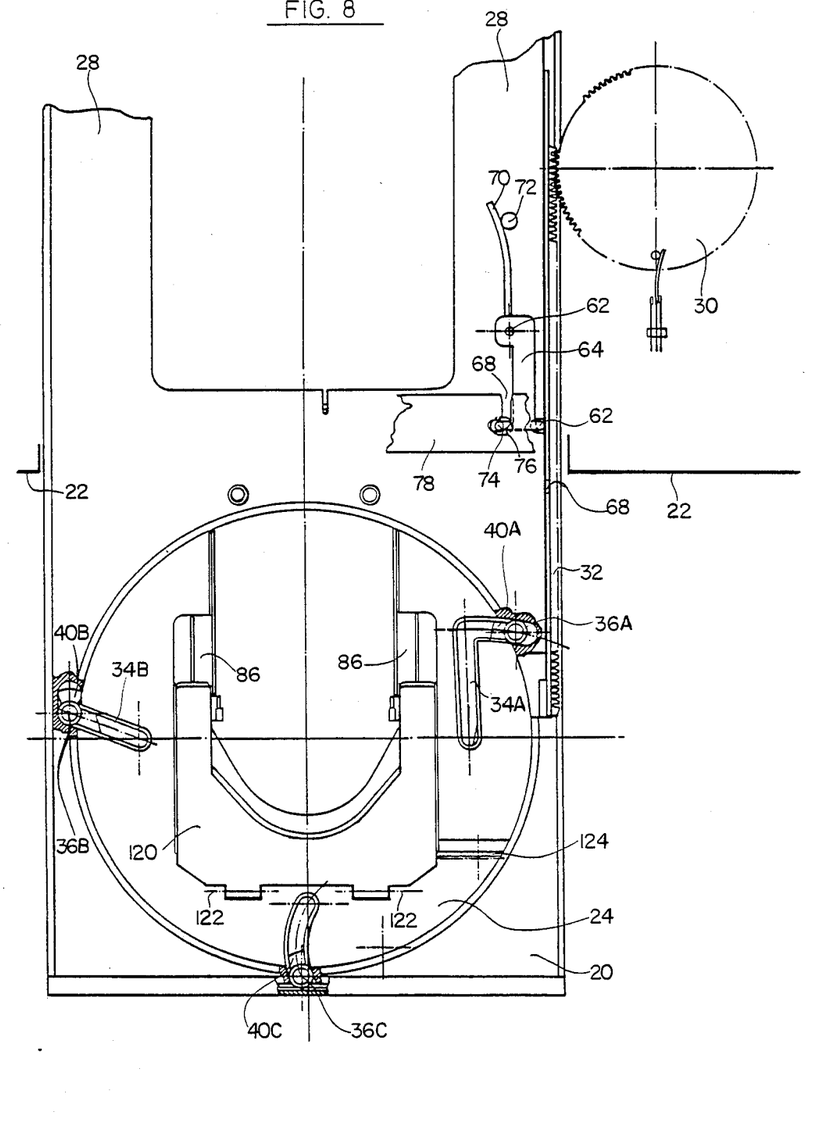
FIGS. 8 and 9 are views similar to FIGS. 1 and 2 representing a second embodiment of the invention.
Figure 9:
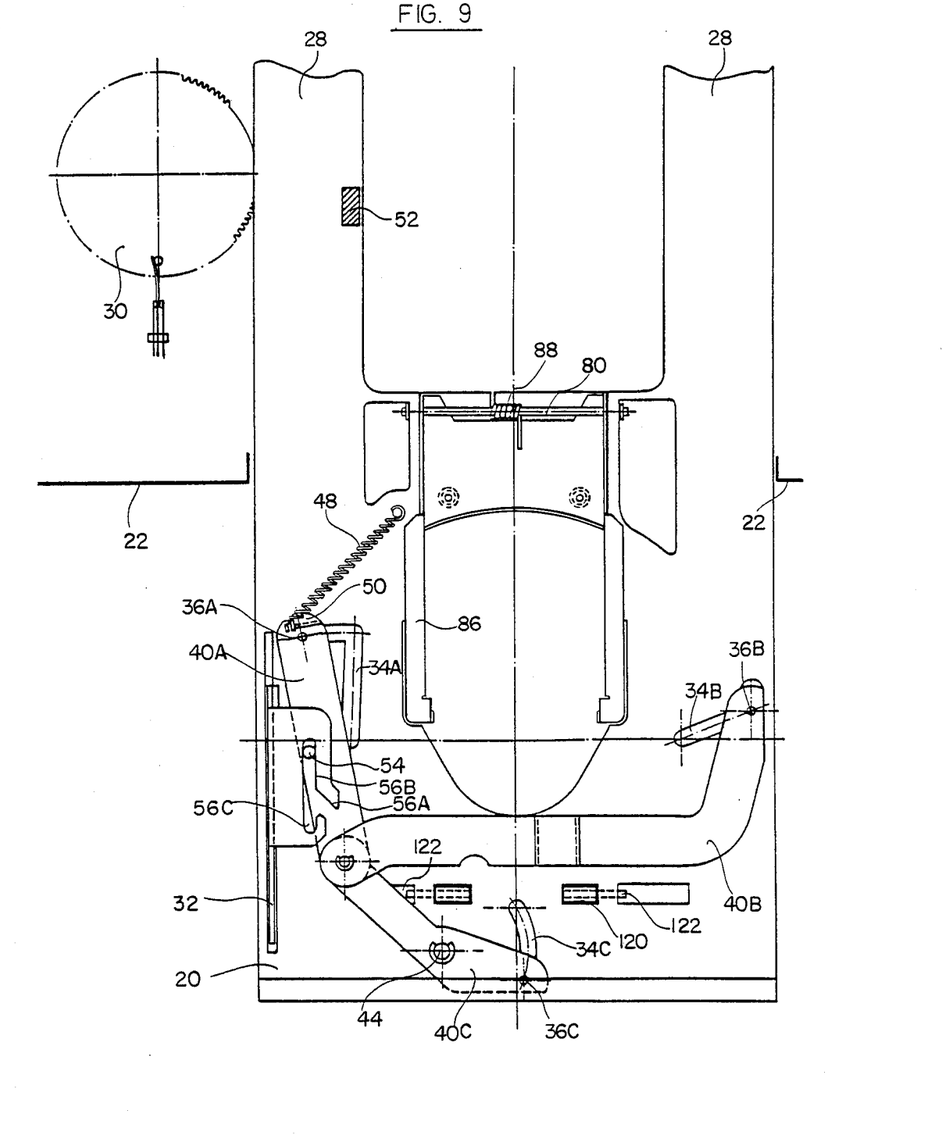

Second Embodiment—FIGS. 8–10:

As mentioned in the introduction, this embodiment advantageously combines the mechanism described above with a loading system forming the subject of the copending application, Ser. No. 100,631 to which reference may be made for further details regarding its construction and operation.

All the elements described above in the first embodiment are utilized in the second embodiment, with the same reference numerals being used, apart from the following additions (see FIGS. 8–10).

According to this embodiment of the invention, support means 110 are provided on the drawer 20 for tilting a record disc 82 in an inclined position when the drawer 20 is in the external loading/unloading position as illustrated in FIG. 10. The record disc, which may be either a smaller or a larger record disc, is held in the inclined position with the face of the record disc 82 facing upwardly and toward the front of the drawer to facilitate the user removing the record disc 82 from or placing the record disc 110 on the drawer by gripping it at its periphery, minimizing the need to touch the surface of the disc.

For this purpose, the bottom of the recess 24 is partly constituted by a support 120 pivoting about a pin 122 and having a pin 124 extending laterally to cooperate with the profile 127 of a cam 126 rigidly connected to the rack 32, shown in FIG. 10. During the relative movement of the rack 32 in relation to the drawer 20, the profile 127 acts on the pin 124 to cause the downward or upward pivoting of the support 120 according to the direction of translation of the rack 32, thus raising or lowering the record disc 82 between the inclined position which is desired in the external loading/unloading position of the drawer and a substantially horizontal position of the record disc which is desired as the drawer moves into and out of the housing.

Figure 12:
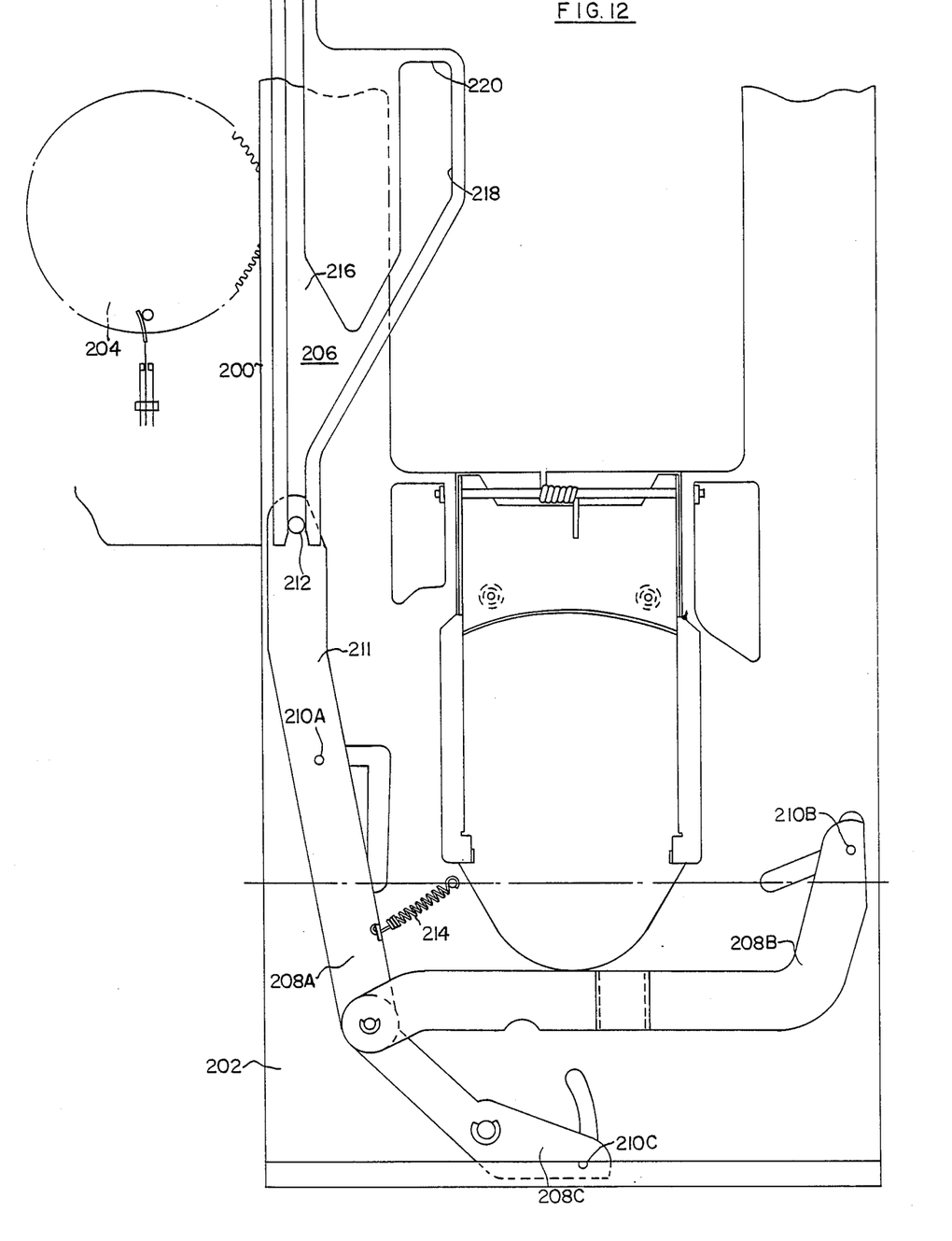
FIG. 12 is a view from below of a drawer including another embodiment of actuating means including a rack made integral with the drawer.

Third Embodiment—FIG. 12:

In the previous embodiments, the rack and drawer are connected by means which allows relative movement between in an initial stage during which the sensing of the presence of a larger record disc on the drawer in the loading/unloading position is carried out. Thus, the drawer is caused to move only after the "sensing" operation has been carried out. However, as indicated in FIG. 12, in accordance with this embodiment of the invention, the rack 200 driving the drawer 202 is made integral with the drawer, and, thus, rotation of the driving pinion 204 moves the drawer 202 in-and-out without relative movement occurring between them in an initial stage.

FIG. 12 is a bottom view similar to FIG. 2 of the first embodiment. The portions of the housing of the unit located under the drawer have not been represented for the sake of simplicity, but a profile 206 that the housing supports is represented.

As in the previous embodiments, the drawer 202 is provided with three supports 208A, 208B, 208C having at one of their respective ends a stud 210A, 210B, 210C cooperating with the periphery of the record disc which has been loaded by the user on the drawer.

The one of the supports 208A which serves for sensing the presence of a larger record disc has an arm 211 which extends toward the housing and carries a pin 212 which cooperates with the fixed profile 206 on the housing. The support 208A is resiliently actuated by a spring 214 of which one extremity is attached to the drawer 202. The profile 206 has two channels 216, 218, respectively, for guiding the pin 212 as well as an abutment 220.

When a record disc has been loaded on the drawer 202 by the user, the drawer 202 is automatically or upon command by the user translated by a motor (not shown) rotating the driving pinion 204. When the pin 212 runs along the profile 206, the spring 214 tends to rotate it clockwise as the drawer moves into the housing through the front loading opening, and, if the record disc is of a smaller diameter, this clockwise rotation caused by the spring 214 will drive the pin 212 toward the channel 218 and eventually against the abutment 220. Thus, as the drawer 202 is further moved into the housing, the support 208A is stopped, and, thus, the coordinated movement of the three supports 208A, 208B, 208C and the studs 210A, 210B, 210C carried thereby is performed, as previously described, for centering the record disc.

If the record disc placed by the user on the drawer 202 when in the loading/unloading position is of a larger diameter, the stud 210A carried by the "sensing" support 208A engages the periphery of the record disc, which prevents its clockwise displacement, and, thus, the pin 212, instead of entering the channel 218, enters the other channel 216 which, due to its design, drives the support 208A back to its rest position, returning it outwardly to a position in which the stud 210A carried thereby is returned outwardly, spaced from the periphery of the record disc to allow free rotation without interference with the record disc once it is in the operating position on the turntable.

Although the various described embodiments handle discs of two different diameters, it is easy to understand that they could also handle discs of an intermediate diameter, for instance, four inch discs, without departing from the scope of the invention.

In fact, should such a disc be positioned in the recess 24 and the loading movement be powered, the stud 36A will be permitted to pivot, as described above, but less than if it were a small disc because its periphery will come into contact with the lateral side of the recess after a smaller displacement of said stud 36A.

Thus, by modifying the shape of the slot 34A for handling a smaller pivoting of the stud 36A and the profiles 56A, 56B and 56C of the cam member 56 and incorporating at the appropriate location on the housing an additional fixed profile 52 or channel (218, 220), the device can properly center a disc of an intermediate diameter.

What is claimed is:

1. A record disc player apparatus comprising:
   a turntable; and
   loading means for carrying a record disc between a loading/unloading position and an operating position on said turntable, said loading means including:
   at least three movable studs disposed generally equidistantly about an axis of said loading means which move inwardly generally toward the axis from a position spaced outwardly of the periphery of a larger of different diameter record discs which said loading means is adapted to carry concentric with the axis and which return to the outwardly spaced position upon operation of said loading means;
   interconnected movable supports carrying said studs, the interconnection of said supports allowing one of said supports to be moved independently of the other of said supports upon operation of said loading means to move the one of said studs carried thereby inwardly independently of others of said studs to engage the periphery of a larger record disc supported on said loading means and thereby to sense the presence of a larger record disc while the others of said studs remain at the outwardly spaced position;
   a guide member which guides said one support to return said one stud to the outwardly spaced position in response to said one stud sensing the presence of a larger record disc and which guides said one support into an actuating position only after a predetermined displacement of said one support indicating the absence of a larger record disc; and
   an actuating structure which is operative when said one support is in the actuating position and which moves said interconnected supports and the studs carried thereby simultaneously inwardly to engage the periphery of and center a smaller of the different diameter record discs.

2. An apparatus according to claim 1 wherein inward movement of said one movable support is limited by a larger record disc carried on said loading means to the predetermined displacement and said one of said movable supports thereby senses the presence of the larger record disc on said loading means.

3. An apparatus according to claim 1 including:
   a housing for said turntable;
   said loading means including a drawer supported for in-and-out movement relative to said housing to carry a record disc between an external loading/unloading position on said drawer and an internal operating position on said turntable in loading and unloading operations.

4. An apparatus according to claim 3 wherein said loading means includes:
   an actuating member for moving said drawer;
   a cam operated by said actuating member;
   a pin mounted on said one of said movable supports;
   said cam having at least two profiles for engaging and cooperating with said pin, one of said profiles acting on said pin to release said one of said movable supports only after the predetermined displacement to allow coordinated movement of all supports to center the smaller record disc when on said drawer and another of said profiles acting on said pin to restrain said one of said movable supports when it has not undergone the predetermined displacement to limit interference with a larger record disc when present on said drawer.

5. An apparatus according to claim 4 wherein said one of said profiles of said cam allows said pin to escape from the action of said cam.

6. An apparatus according to claim 5 wherein said another profile confines said pin when said one of said movable supports has not undergone the predetermined movement.

7. An apparatus according to claim 1 including resilient means acting on said one of said supports to cause the predetermined displacement.

8. An apparatus according to claim 4 wherein said cam is rigidly connected to said actuating member, said actuating member having oblong openings and said drawer having pins received in said oblong openings to permit a relative movement thereof in relation to said drawer.

9. An apparatus according to claim 4 including fixed means having a profile cooperating with said one of said movable supports upon movement of said drawer into said housing when a smaller record disc is on said drawer and said pin has escaped from the action of said cam, and moving all said supports inwardly through said interconnecting means in a coordinated manner to center the smaller record disc when on said drawer.

10. An apparatus according to claim 9 including resilient means acting on said supports and wherein said profile on said fixed means causes, at an end portion of movement of said drawer into said housing to carry a record disc to the operating position on said turntable, a slight return of said supports under the influence of said resilient means to disengage said studs from the periphery of the smaller record disc in order to permit its free rotation by said turntable.

11. An apparatus according to claim 6 wherein said another profile acting on said pin guides said one of said movable supports and all said supports interconnected therewith and said studs carried thereby in a return direction to a position in which all studs are disengaged from the periphery of a larger record disc about the axis.

12. An apparatus according to claim 3 wherein said drawer has a substantially circular depression having a diameter slightly larger than the larger record disc for receiving and generally centering the larger record disc.

13. An apparatus according to claim 1, said loading means including a drawer movable into and out of said apparatus from a loading/unloading position outside said apparatus, and fixed means cooperating with said one of said movable supports upon movement of said drawer into said apparatus for moving said one of said movable supports and, through said interconnecting means, all other supports to perform the coordinated movement of said three studs and center the smaller record disc.

14. A record disc player apparatus comprising:
   a housing;
   a turntable mounted inside said housing; and
   loading means for loading record discs of different diameters on said turntable, said loading means including:
   a drawer movable to carry a record disc between an operating position on said turntable and a loading/unloading position outside said housing;

means on said drawer for receiving a larger of the different diameter record discs and centering the larger disc about an axis;

at least three movable studs disposed generally equidistantly about the axis said studs moving inwardly generally toward the axis from a position spaced outwardly of the periphery of the larger record disc when the larger record is on said drawer and centered on the axis and which return to the outwardly spaced position upon operation of said loading means;

interconnected movable supports carrying said studs mounted on said drawer, the interconnection of said supports allowing one of said supports to be moved independently of the other of said supports upon operation of said loading means to move the one of said studs carried thereby inwardly independently of others of said studs to engage the periphery of a larger record disc supported on said drawer and thereby to sense the presence of a larger record disc while the others of said studs remain at the outwardly spaced position;

a guide member which guides said one support to return said one stud to the outwardly spaced position in response to said one stud sensing the presence of a larger record disc and which guides said one support into an actuating position only after a predetermined displacement of said one support indicating the absence of a larger record disc; and an actuating structure which is operative when said one support is in the actuating position and which moves said interconnected supports and the studs carried thereby simultaneously inwardly to engage the periphery of and center a smaller of the different diameter record discs.

15. An apparatus according to claim 14 including means for sensing engagement of said one stud with the periphery of a larger of the different diameter record discs when on the drawer upon inward movement of said one stud and for returning said one stud outwardly and disengaged from the periphery of the larger record disc in response to the engagement thereby with the periphery.

16. A record disc player apparatus comprising:

loading means for carrying a record disc between a loading/unloading position and an operating position in said apparatus, said loading means including:

centering means for centering record discs of different diameters about an axis of said loading means;

said centering means including a plurality of movable studs disposed generally equidistantly about an axis of said loading means which move generally toward the axis from a position spaced outwardly of the periphery of a larger of different diameter record discs which said loading means is adapted to carry concentric with the axis and which return to the outwardly spaced position upon operation of said loading means;

interconnected movable supports carrying said studs, the interconnection of said supports allowing one of said supports to be moved independently of the other of said supports upon operation of said loading means to move the one of said studs carried thereby inwardly independently of others of said studs to engage the periphery of a larger record disc supported on said loading means and thereby to sense the presence of a larger record disc while the others of said studs remain at the outwardly spaced position;

a guide member which guides said one support to return said one stud to the outwardly spaced position in response to said one stud sensing the presence of a larger record disc and which guides said one support into an actuating position only after a predetermined displacement of said one support indicating the absence of a larger record disc; and an actuating structure which is operative when said one support is in the actuating position and which moves said interconnected supports and the studs carried thereby simultaneously inwardly to engage the periphery of and center a smaller of the different diameter record discs.

17. A record disc player apparatus comprising:

a turntable; and loading means for carrying a record disc between a loading/unloading position and an operating position on said turntable, said loading means including:

at least three movable studs disposed generally equidistantly about an axis of said loading means; and means for moving and for guiding said studs inwardly generally toward the axis from a position spaced outwardly of the periphery of a larger of different diameter record discs which said loading means is adapted to carry concentric with the axis and for returning said studs to the outwardly spaced position upon operation of said loading means;

said means for moving and for guiding including interconnected movable supports carrying said studs, the interconnection of said supports allowing one of said supports to be moved independently of other of said supports upon operation of said loading means to move one of said studs carried thereby inwardly independently of other of said studs to engage a larger record disc supported on said loading means and thereby to sense the presence of a larger record disc while the other of said studs remain at the outwardly spaced position;

said means for moving and for guiding further including a guide member for guiding said one support to return said one stud to the outwardly spaced position in response to said one stud sensing the presence of a larger record disc and for guiding said one support into an actuating position only after a predetermined displacement of said one support indicating the absence of a larger record disc; and means operative when said one support is in the actuating position for moving said interconnected supports and the studs carried thereby simultaneously inwardly to engage the periphery of and center a smaller of the different diameter record discs.

* * * * *